US009347237B2

(12) United States Patent
Ponciano

(10) Patent No.: US 9,347,237 B2
(45) Date of Patent: May 24, 2016

(54) PORTABLE HUNTING BLIND AND ATTACHMENT

(75) Inventor: James M. Ponciano, Van Couver, WA (US)

(73) Assignee: Covercraft Industries, LLC, Pauls Valley, OK (US)

( * ) Notice: Subject to any disclaimer, the term of this patent is extended or adjusted under 35 U.S.C. 154(b) by 0 days.

(21) Appl. No.: 13/460,930

(22) Filed: May 1, 2012

(65) Prior Publication Data
US 2013/0152988 A1 Jun. 20, 2013

Related U.S. Application Data

(60) Provisional application No. 61/577,736, filed on Dec. 20, 2011.

(51) Int. Cl.
E04H 15/00 (2006.01)
E04H 15/54 (2006.01)
E04H 15/64 (2006.01)
A01M 31/02 (2006.01)
E04H 15/32 (2006.01)

(52) U.S. Cl.
CPC ........... *E04H 15/001* (2013.01); *A01M 31/025* (2013.01); *E04H 15/54* (2013.01); *E04H 15/64* (2013.01); *E04H 2015/326* (2013.01); *Y10T 29/49623* (2015.01); *Y10T 29/49629* (2015.01)

(58) Field of Classification Search
CPC ....... E04H 15/54; E04H 15/64; E04H 15/001; A01M 31/025
USPC ......... 135/124, 125, 127, 138, 143, 115, 119, 135/120.4, 901, 913
See application file for complete search history.

(56) References Cited

U.S. PATENT DOCUMENTS

| 1,817,871 | A | * | 8/1931 | Brandt | ........................ 428/211.1 |
| 2,349,993 | A | * | 5/1944 | Schwimmer et al. | ........... 135/97 |
| 2,816,297 | A | * | 12/1957 | Stanley | ................. A01M 31/00 114/351 |
| 3,810,482 | A | * | 5/1974 | Beavers | ........................ 135/147 |
| 4,576,904 | A | | 3/1986 | Anitole | |
| 4,900,204 | A | | 2/1990 | Summers | |
| 5,050,924 | A | | 9/1991 | Hansen | |
| 5,410,982 | A | * | 5/1995 | Mann | ....................... B63B 17/02 114/343 |
| 5,592,960 | A | | 1/1997 | Williams | |
| 5,692,534 | A | * | 12/1997 | Brumfield | ........................ 135/90 |
| 5,869,162 | A | | 2/1999 | Traa | |
| 5,989,656 | A | * | 11/1999 | Soloman | ............ B65D 77/0406 150/154 |
| 6,202,665 | B1 | | 3/2001 | O'Hare | |
| 6,202,666 | B1 | | 3/2001 | Rehbein | |
| 6,415,806 | B1 | * | 7/2002 | Gillis | ............................ 135/124 |
| 6,419,432 | B1 | | 7/2002 | Chou | |
| 6,637,991 | B2 | | 10/2003 | Looker et al. | |
| 6,699,803 | B2 | * | 3/2004 | Muirhead | ........................ 442/2 |
| 6,892,742 | B2 | * | 5/2005 | Wang | ............................ 135/125 |
| 7,070,373 | B2 | | 7/2006 | Brown | |
| 7,100,626 | B2 | | 9/2006 | Livacich | |
| 7,225,823 | B1 | * | 6/2007 | Ransom et al. | ................ 135/126 |
| 7,320,332 | B2 | * | 1/2008 | Reis | ........................ E04H 15/44 135/115 |
| 7,568,492 | B1 | | 8/2009 | Helmer | |

(Continued)

*Primary Examiner* — Noah Chandler Hawk
(74) *Attorney, Agent, or Firm* — Thorpe, North & Western, LLP

(57) ABSTRACT

A cord assembly is disclosed for use in connection with a variety of purposes including with a portable hunting blind. In one embodiment of the invention, the cord assembly has a plurality of resilient cord members forming a main panel and additional resilient cord members extending outward from the main panel.

5 Claims, 12 Drawing Sheets

(56) References Cited

U.S. PATENT DOCUMENTS

| | | | |
|---|---|---|---|
| 7,650,899 B2 * | 1/2010 | Eastman et al. | 135/120.1 |
| 7,766,022 B2 | 8/2010 | Livacich et al. | |
| 7,789,098 B2 | 9/2010 | Livacich et al. | |
| 7,802,582 B2 | 9/2010 | Livacich et al. | |
| 7,828,038 B2 | 11/2010 | Livacich | |
| 7,841,355 B2 | 11/2010 | Livacich et al. | |
| 8,066,022 B2 * | 11/2011 | Schlipf | E04H 15/001 135/120.1 |
| 8,826,927 B1 * | 9/2014 | Beam et al. | 135/120.1 |
| 2001/0022189 A1 | 9/2001 | Hexels | |
| 2002/0189660 A1 | 12/2002 | Livacich | |
| 2005/0183761 A1 | 8/2005 | Livacich | |
| 2006/0000499 A1 | 1/2006 | Livacich et al. | |
| 2006/0005487 A1 | 1/2006 | Morrow | |
| 2006/0283491 A1 | 12/2006 | Livacich et al. | |
| 2006/0283492 A1 | 12/2006 | Livacich et al. | |
| 2008/0006317 A1 | 1/2008 | Lavacich et al. | |
| 2009/0065039 A1 | 3/2009 | Lavacich et al. | |
| 2009/0272414 A1 | 11/2009 | Lavacich et al. | |
| 2010/0200038 A1 | 8/2010 | Roman et al. | |
| 2010/0229906 A1 | 9/2010 | Putman | |
| 2011/0005561 A1 | 1/2011 | Noll | |
| 2011/0024059 A1 | 2/2011 | Livacich | |
| 2011/0030752 A1 | 2/2011 | Livacich et al. | |
| 2011/0108078 A1 | 5/2011 | Roman et al. | |

* cited by examiner

PORTABLE HUNTING BLIND AND ATTACHMENT

CLAIM OF PRIORITY

This application claims priority to U.S. Provisional Patent Application No. 61/577,736 filed on Dec. 20, 2011 and entitled "Portable Hunting Blind" which is incorporated herein by reference in its entirety.

FIELD OF THE INVENTION

The present invention relates to methods and devices for camouflage. In particular, the invention relates to hunting blinds that may be used to conceal bodily movement from an outdoor enthusiast's quarry.

BACKGROUND OF THE INVENTION AND RELATED ART

Hunters and other wildlife observers conceal bodily movement from the vision of objects of their outdoor activities (such as deer, elk, geese, and the like) with a hunting blind. A typical hunting blind comprises a frame covered by concealment panels of a camouflage material. The pattern of the camouflage material is chosen to blend with the natural surroundings as the camouflage material is usually opaque or only slightly open (such as leaf-shaped cut outs or patterns in see-through materials), an outdoor enthusiast can be within the enclosed space without alerting nearby animals.

Currently, there are a variety of different types of hunting blinds available on the market. Some examples include enclosed trees stands that generally mounted to the trunk or branch of a tree. A tree stand enhances a hunter's field-of-view and reduces the risk of detection by placing the hunter above the line-of-sight of the animal. Other types of hunting blinds include simple frames meant to sit on the ground covered with camouflage material. Since outdoorsmen often walk great distances into the woods and/or move from tree to tree, it is highly desirable that the hunting blind be easily collapsible and portable. They should be structurally and mechanically simple. The structure and design of a hunting blind are balanced with concerns related to the visual appearance of the blind.

The type of camouflage employed by the hunting blind is always a function of the area where the outdoorsman is located. In particular, hunters or other wildlife enthusiasts may find themselves in a wooded area during a certain time of year where a particular color and particular pattern of camouflage are desirable. In contrast, in a swamp area during a certain time a year a different color and pattern configuration may be desirable. Examples of different camouflage patterns known in the art and used by outdoorsman include the US woodland pattern, universal camouflage, six-color desert pattern, oak-leaf, swampland, frog-skin, tiger stripe, and many more. Put plainly, there are numerous combinations of colors and patterns all known to one of skill in the art that may be desirable in different locations and different times of year. It is apparent that a problem exists for outdoorsmen who wish to experience nature in different locales and at different times of year yet do not want to purchase hunting blinds with camouflage specific for each locale or time of year.

Improving methods for creating camouflage has been a field of interest for some time as evidenced by U.S. Pat. No. 4,576,904 which describes the use photographic and photo-optic methods to capture foliage and background images for patterns on a blind. This method is heavy and highly technical. U.S. Pat. No. 5,592,960 describes a hunting blind with mirrored outer walls. This method would, however, reflect any movement made by animals scaring them away or encouraging them to engage in a territorial dispute. U.S. Pat. No. 6,202,666 describes a photographic method for creating an outdoor tent with an internal image of a distant place. The photographic images are carefully edited to fit a particular assembly. This is also highly technical, expensive, and time consuming for any hunter. Accordingly, the prior art fails to satisfactorily address the need to provide a simple means to mimic the surrounding environment thereby preserving the outdoorsman's ability to discreetly observe wildlife.

SUMMARY OF THE INVENTION

In light of the problems and deficiencies inherent in the prior art, the present invention seeks to overcome these by providing a portable hunting blind and attachment for more easily mimicking the surrounding environment.

In accordance with the invention as embodied and broadly described herein, the present invention features a first plurality of resilient interconnected cord members forming a main panel. The main panel comprises an outer perimeter circumscribing the first plurality of resilient interconnected cord members. At least two resilient cord members disposed about opposing sides of the perimeter of the main panel.

In another embodiment, the cord assembly comprises a first plurality of resilient interconnected cord members forming a main panel and a second plurality of resilient interconnected cord members comprising a plurality of at least two separate wing panels extending outward from the main panel. The wing panels comprise at least two cord members extending outward from a portion of the main panel in substantially divergent directions for a first predetermined distance and in substantially convergent directions for a second predetermined distance.

In accordance with another embodiment of the invention, a portable hunting blind is disclosed, comprising a framework configured to enclose a space and a plurality of interconnected cord members disposed about the exterior of the framework adapted to receive and secure camouflage materials between the cord members and the framework.

The present invention also features a method of creating a camouflage enclosure, comprising providing a framework configured to enclose a space, disposing a cord assembly about the framework, said cord assembly adapted to receive and secure elements from the ambient environment between the cord assembly and the framework, and disposing elements from the ambient environment about the framework between said framework and said cord device.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
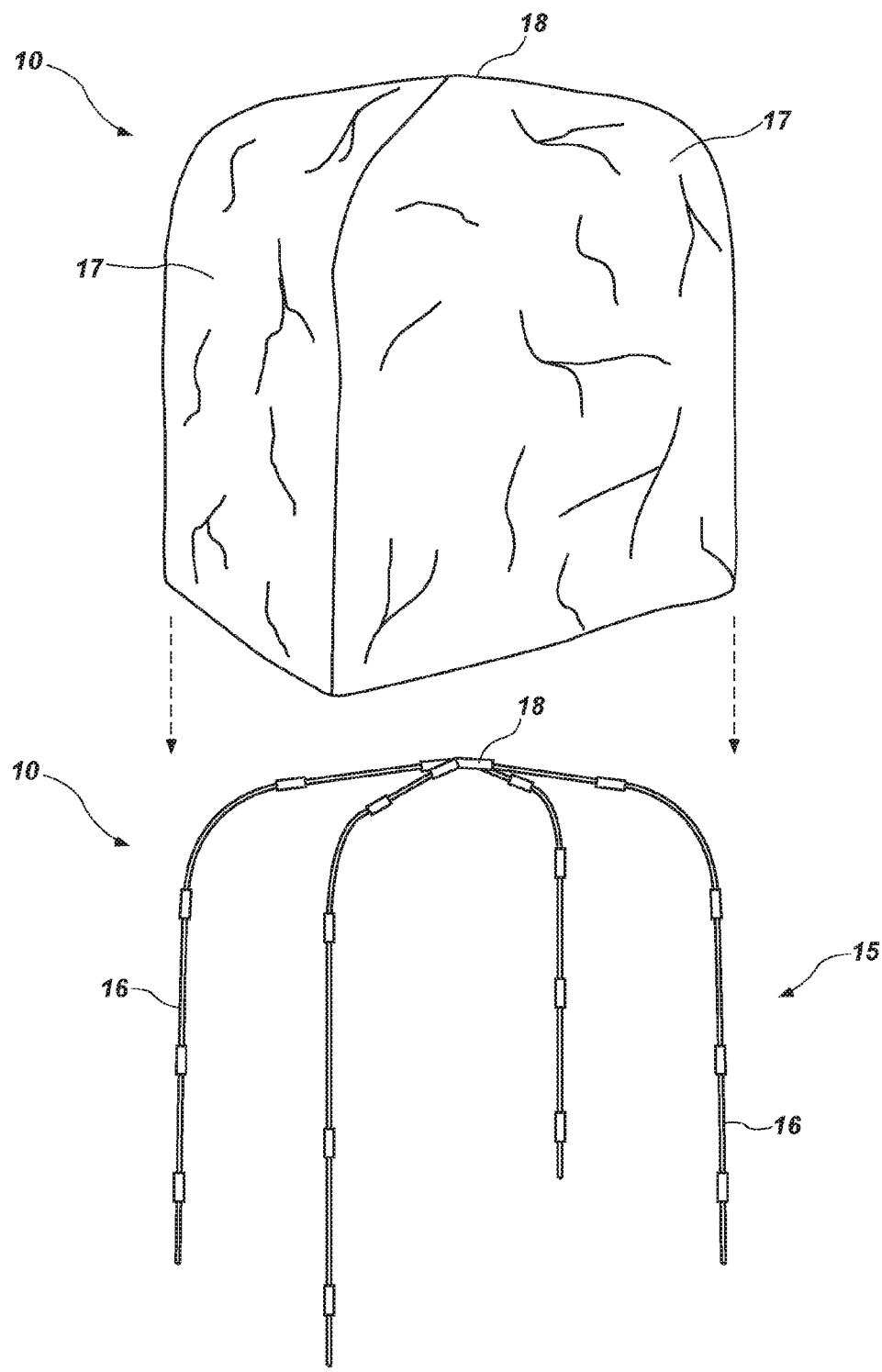
FIG. 1 shows a hunting blind typical of prior art hunting blinds.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Active camouflage or adaptive camouflage, is a group of camouflage technologies which allow an object to blend into its surroundings by use of panels or coatings capable of altering their appearance, color, luminance and/or reflective properties. Active camouflage has the capacity to provide concealment from visual detection. Presently, active or adaptive camouflage techniques are typically thought of as extremely high-tech military contraptions not suitable for common outdoor hunting or wildlife observation. The present invention describes a hunting blind and related attachment which employs active camouflage techniques by incorporating actual material from the surrounding environment into the hunting blind.

Generally speaking, the hunting blind has a framework adapted to enclose a space suitable for one or more persons. The framework is covered with a camouflage material suitable for a particular environment with voids or spaces within the camouflage through which a hunter or wildlife observer can view its target quarry. A plurality of cords, webbing, net, or the like is disposed about the outside of the camouflage material to provide a means by which a hunter may attach actual materials, such as branches, leaves, bushes, and the like onto the hunting blind itself. In other words, the hunting blind incorporates field-expedient concealment techniques utilizing material native to the surrounding environment. The native materials can be removed when the hunting blind is moved to a different location and new native materials may be incorporated thus providing for a versatile hunting blind that can be used in numerous different locations.

The present invention provides several significant advantages over prior related hunting blinds. Many advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Referring now to FIG. 1, in accordance with one embodiment of the invention, a hunting blind 10 is provided having a framework 15 configured to enclose a space. The framework 15 may be any number of configurations known in the art. For example, the framework 15 may comprise a collapsible interconnected network of rods 16 held together with elastic cords disposed within the rods. In another example, the framework 15 may comprise a plurality of rods 16 that may be have threaded ends for assembly and disassembly in the field. So long as the framework 15 operates to provide a means to cover the enclosed space with camouflage material (synthetic, organic, inorganic, etc.), it is sufficient. The space within the framework 15 is large enough to accommodate at least one person. Over the top of, or at least incorporated onto, the framework 15 is an assembly of camouflage-type sheet(s) 17 or cover member (as are known in the art) configured to cover the enclosed space with material having a desired camouflage pattern. While a camouflage pattern is specifically referenced herein, it is important to note for purposes of the present application, a solid color (e.g., solid dark green) could be employed to suit a particular purpose. The camouflage cover 17 may be configured with windows or voids to allow the outdoorsman to see outside of the enclosure and, if desired, direct a weapon, camera or visual enhancement device game. For example, in one aspect of the invention, the user may change a substantially solid camouflage cover 17 from the hunting blind structure to a transparent netting or mesh, which would allow for more air circulation in an otherwise hot structure. In some aspects, the cover 17 may have a removable roof or no roof at all depending on a particular application. Additionally, while the use of a camouflage cover 17 is specifically referenced herein, it is understood that the cover 17 is not necessary for every application of the present invention. That is, a framework 15 together with an interconnected cord member (discussed below) is sufficient in one aspect of the invention.

Figure 2:
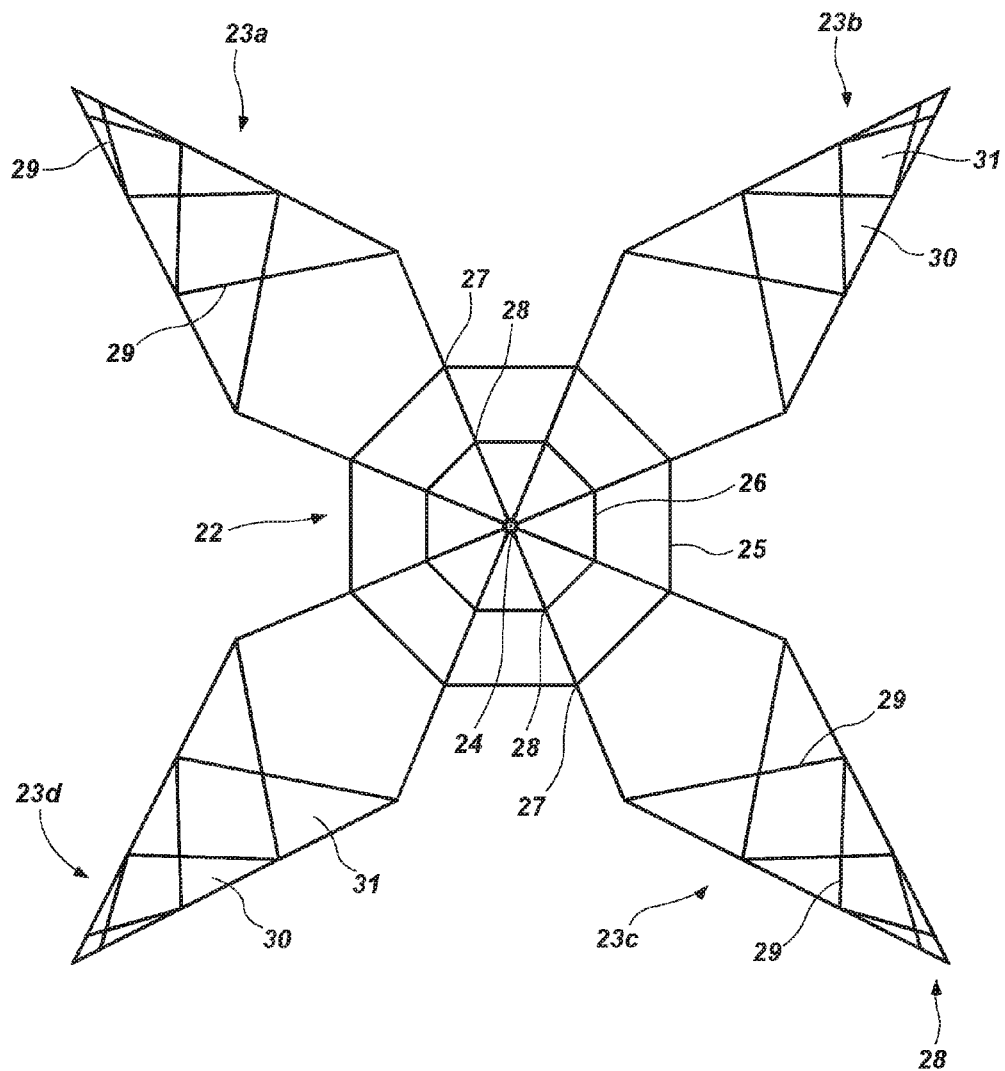
FIG. 2 shows a plurality of interconnected cord members in accordance with one embodiment of the invention.

With reference now to FIG. 2, in accordance with one embodiment of the invention, a plurality of interconnected cord members (or netting strands) are provided. The individual cord members 21 form a net or cord assembly having a main panel 22 and a plurality of wing panels 23 extending radially outward from the center 24 of the main panel 22. In one aspect of the invention, the main panel 22 comprises two concentric FIGS. 25, 26 shaped to approximate octagons though other shapes may be used and are contemplated herein. Four wings (23a, 23b, 23c, 23d), each shaped to approximate a diamond, extend outward from the center 24 of the main panel 22. While a plurality of interconnected cord members are specifically referenced herein, it is important to note that a single cord member could be used to fashion a cord assembly to achieve the same objective as a plurality of interconnected members. The single member could be arranged with clips, stakes, or other fastening devices to provide a resilient device to be disposed over a hunting blind to enable use of ambient materials for camouflage.

With further referenced to FIG. 2, the proximal end of each wing panel 23 is connected at 27, 28 to each of the concentric octagon FIGS. 25, 26 so as to maintain the structure of the wing near the main panel 22. The distal end 28 of the wing panels 23 is interconnected with additional cords 29 again to maintain the structure of the wing. In one aspect of the invention, the cords connecting the proximal end of the wing are disposed substantially parallel to one another. On the other hand, the cords 29 connecting the distal end 28 of the wing 23 are disposed so that cords on opposing sides of the wing cross one another forming a plurality of triangular shapes 30 and parallelograms 31 within the interior of the wing. While generally diamond-shaped wings are described above, it is understood that other shapes may be used as suits a particular application. For example, a U-shaped wing or generally rectangular shaped wing may be employed without departing from the scope or spirit of the invention. As noted above, aspects of the invention (including the wing assembly) may comprise a plurality of cords or a single cord oriented in a desired shape to provide the functionality described herein.

Figure 3A:
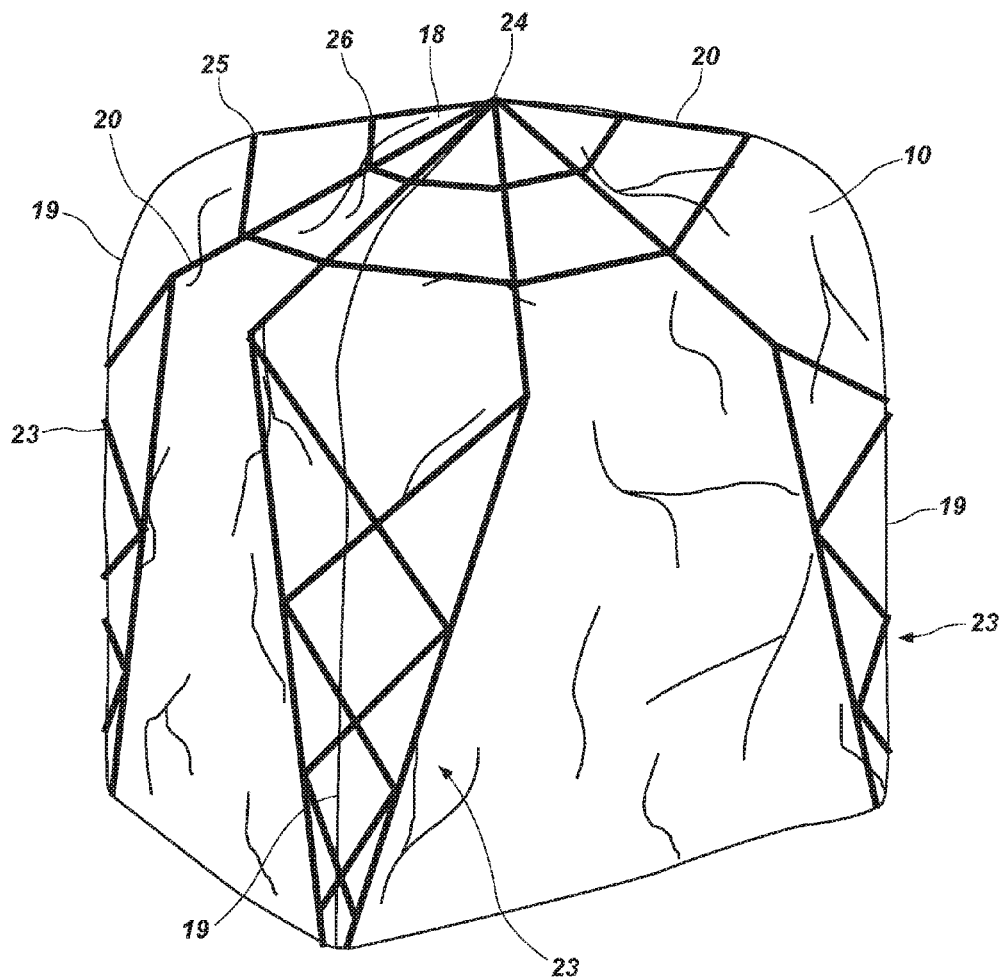
FIG. 3a shows a hunting blind in accordance with one embodiment of the invention.
Figure 3B:
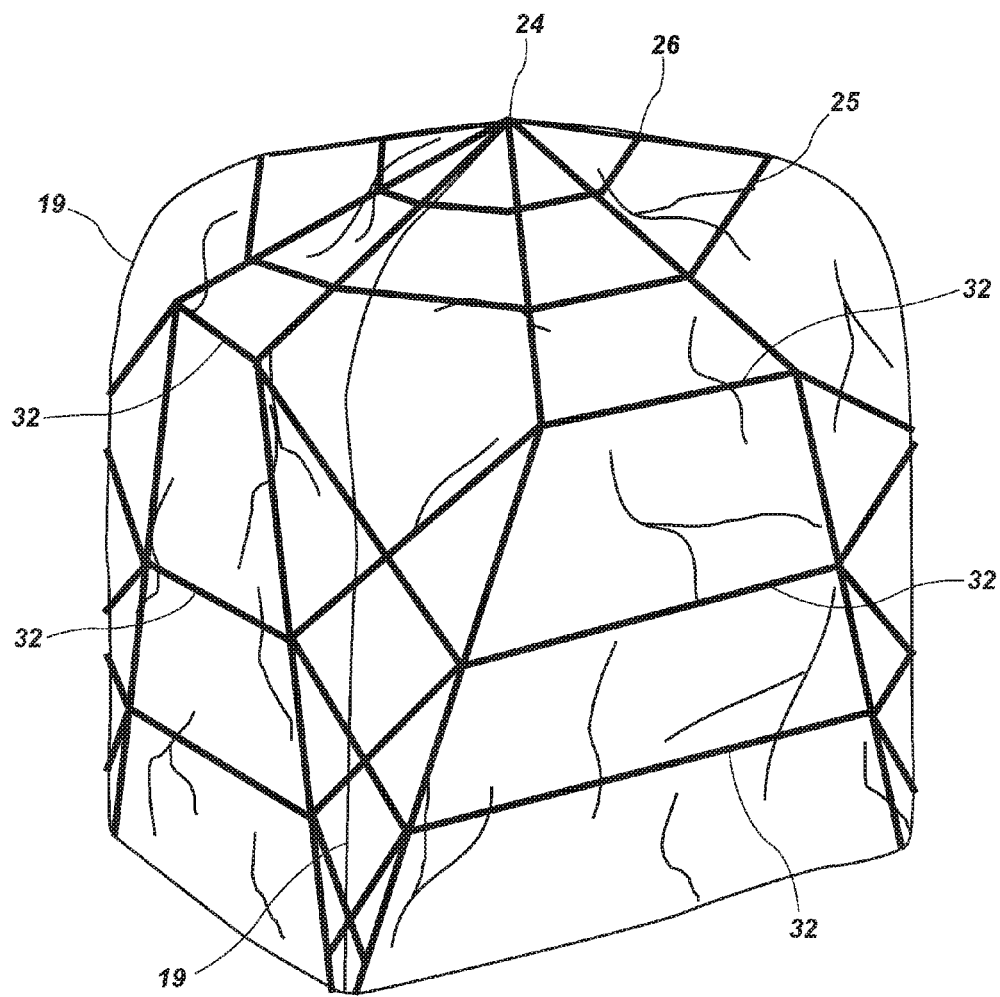
FIG. 3b shows a hunting blind in accordance with one embodiment of the invention.
Figure 3C:
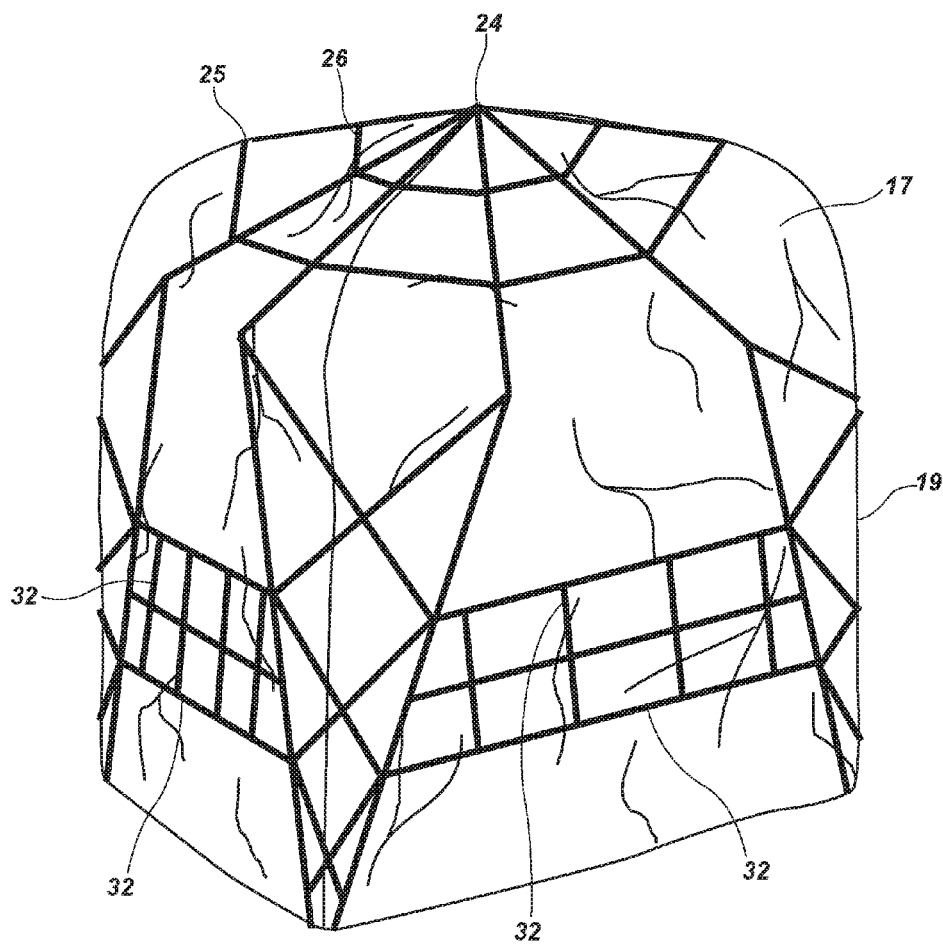
FIG. 3c shows a hunting blind in accordance with one embodiment of the invention.
Figure 4:
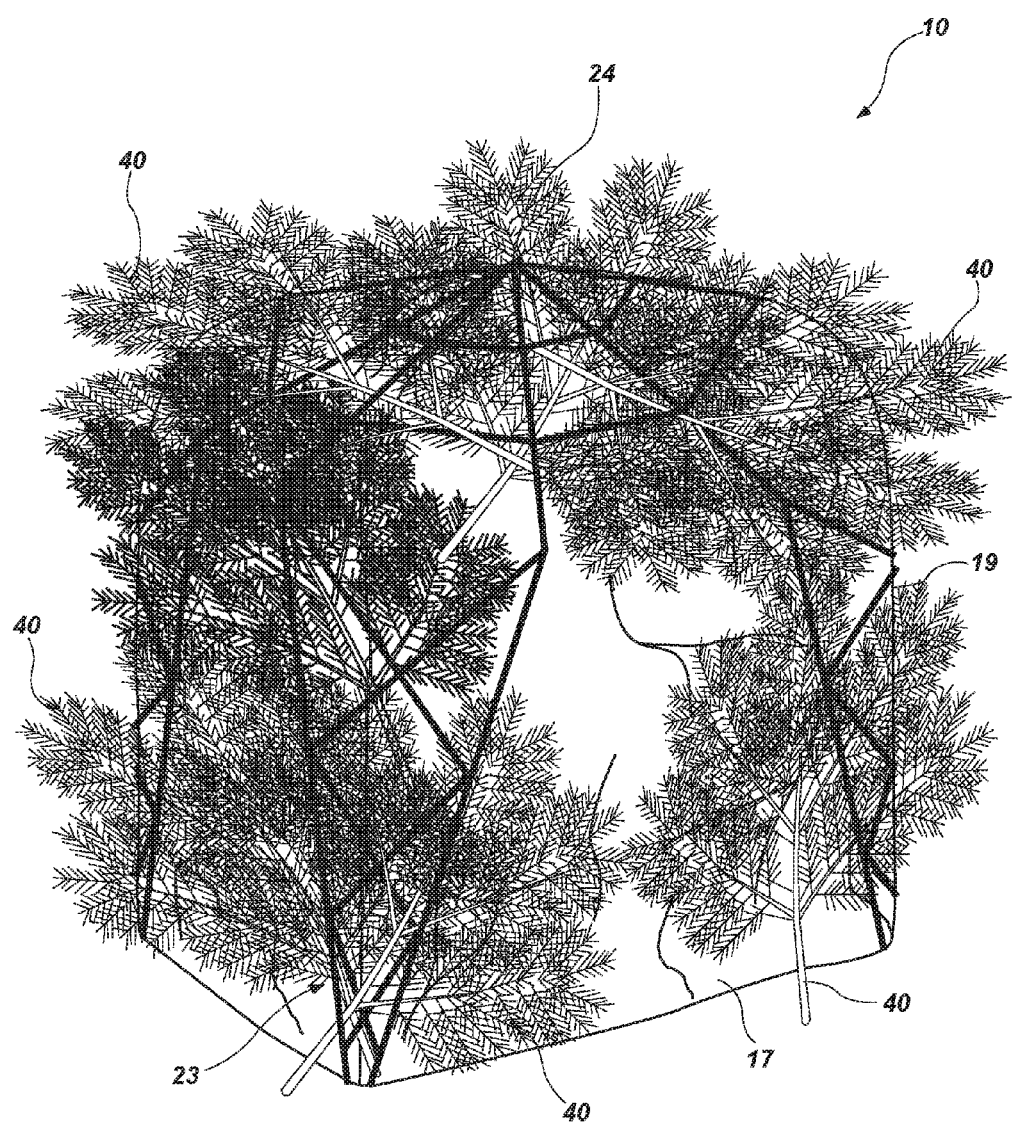
FIG. 4 shows a hunting blind in accordance with one embodiment of the invention.

Referring to FIGS. 3 and 4, in accordance with one aspect of the invention, the net or cord assembly 20 is placed on the exterior of the hunting blind 10 with the main panel 22 disposed on a top surface 18 of the blind 10. In one aspect, the center of the main panel 22 is disposed near the center of the top 18 of the blind. The net or cord assembly 20 is oriented so that each of the wings 23 are directed towards corners 19 of the blind 10 and are extended out over each corner 19 of the blind 10 and down the sides of the corner 19. The distal end of each wing is placed beneath a bottom corner of the blind and secured in place by the tension in the distal end of the wing panel itself, use of a secondary strand of webbing, through the use of a secondary attachment mechanism (such as tent stake, etc.), or other appropriate attachment mechanism. Advantageously, native materials 40 (e.g., branches, grass, bushes, leaves, etc.) from the surrounding environment may be placed between the cords of the net 20 and the blind 10 to give the blind a more realistic appearance.

In one aspect, there is no camouflage sheet 17 covering the framework 15 and the native materials 40 provide the entire camouflage for the blind 10. In another aspect, additional cords 32 may be placed between different wing panels 23 across the sides of the blind 10 to provide for additional means to place native materials and to stabilize the wings 23. In one aspect of the invention, multiple cords may be placed parallel to one another as shown in FIG. 3b or in a pattern a such as that shown in FIG. 3c.

In yet another aspect of the invention, the main panel 22 of cord assembly 20 may be positioned about a side of the blind 10 with wing panels 23 extending around the sides of the blind and/or above the top of the blind 10 as suits a particular application. For example, in one aspect of the invention, the framework 15 may be configured in such a manner that placement of the main panel 22 of the cord assembly or net 22 on a top surface of the framework may not be optimal (e.g., if the top of the framework is entirely open). In such a situation, it may be more feasible to position the main panel 22 on a side surface of the framework with wing panels 23 extending around the sides of the blind 10.

Figure 5:
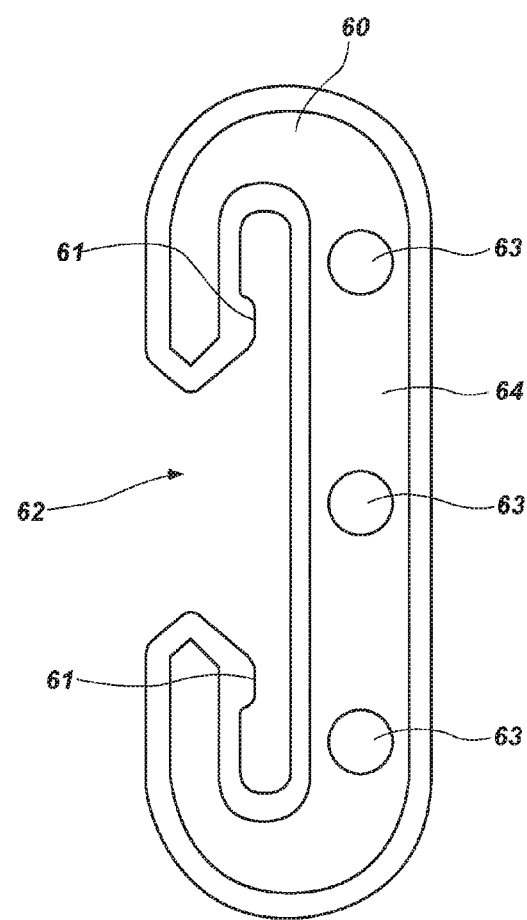
FIG. 5 shows a clip used to connect interconnected cord members.

In one embodiment of the invention, the cords may be connected together by way of knots at cord junctions, clips, clamps, or other means for securing two pieces of cord together as known in the art. An example clip used in accordance with one embodiment of the invention is shown as FIG. 5. The clip 60 is generally c-shaped having a protrusion 61 disposed near the opening 62 of the clip face. Three holes 63 are disposed along the back 64 of the clip 60 for use in connecting cords together. In one aspect, the additional cords 32 shown in FIGS. 3b and 3c are attached to the wings 23 using the clip 60. The length of the cords 32 may be longer or shorter to adjust the tension placed on any respective wing panel 23. In one aspect of the invention, the cords may be equipped with appropriate clips and fasteners such that they may be manipulated in the field to adjust the tension.

Cords discussed herein may comprise natural fibers such as manila hemp, hemp, linen, cotton, coir, jute, sisal, and the like. Alternatively, the cords may comprise synthetic fiber including, but without limitation, polypropylene, nylon, polyesters (e.g., PET, LCP, HPE, Vectran), polyethylene (e.g., Dyneema & Spectra), aramids (e.g., Twaron, Technora and Kevlar), acrylics (e.g., Dralon) and the like. Some cords may be constructed of mixtures of several fibers or use co-polymer fibers as may suit a particular application. In a preferred embodiment, the cords comprise an elastic polymer material capable of stretching about the sides of the framework of the hunting blind. The elastic cord is comprised of one or more elastic strands forming a core, covered in a woven cotton or polypropylene sheath. The sheath does not materially extend elastically, but it is braided with its strands spiraling around the core so that a longitudinal pull causes it to squeeze the core, transmitting the core's elastic compression to the longitudinal extension of the sheath and cord.

Referring now to FIGS. 6-10 generally, other embodiments of the invention are disclosed. With specific reference to FIG. 7, in one embodiment of the invention, the main panel 51 of the net or cord assembly 50 comprises figures shaped to approximate a hexagon 52 and nonagon 53. Three wings 54a, 54b, 54c, each shaped to approximate a diamond, extend outward from the main panel 51. In this embodiment, the proximal ends 55 of the wings 54 do not attach to a center point of the inner FIG. 52. Rather, they attach to the inner FIG. 52 itself. Other configurations are also contemplated herein without departing from the spirit of the invention. For example, in one embodiment, the main panel may one comprise a single figure with wings attached to a center point of the figure or, as noted, connected to corner members of the main panel figure.

Figure 6:
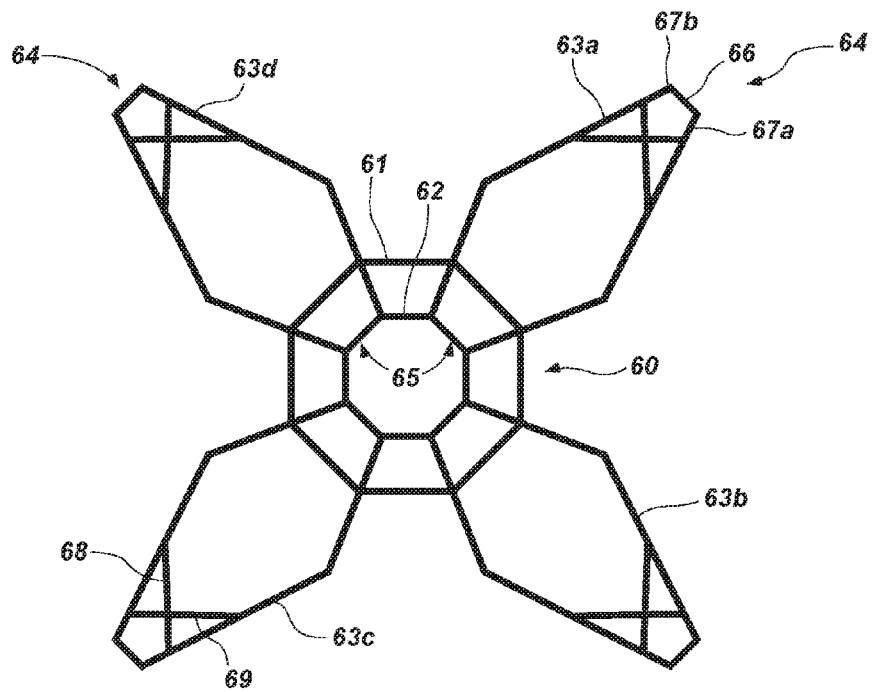
FIG. 6 shows a plurality of interconnected cord members in accordance with one embodiment of the invention.
Figure 7:
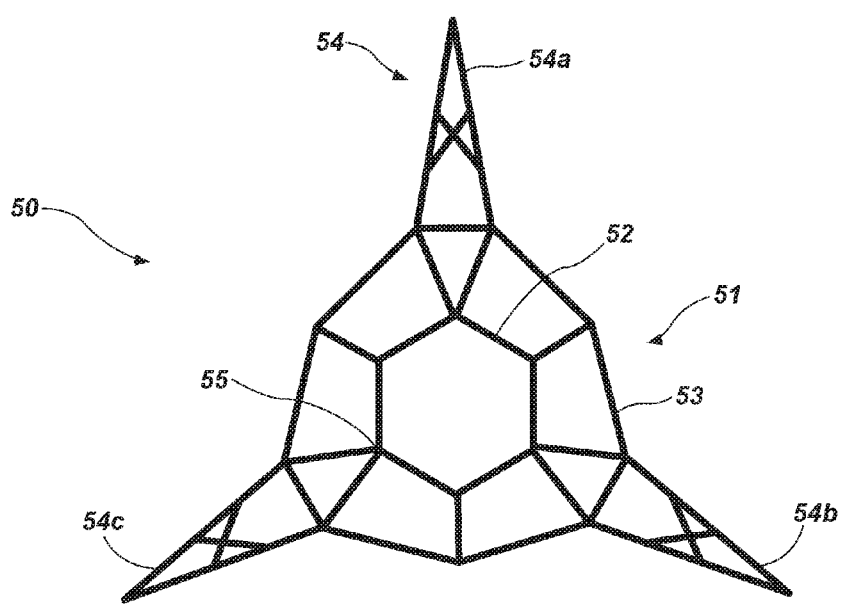
FIG. 7 shows a plurality of interconnected cord members in accordance with one embodiment of the invention.

With specific reference to FIG. 6, two concentric octagons 61, 62 are shown having four wings 63a, 63b, 63c, 63d attached thereto and extending radially therefrom. In one aspect of the invention the distal 64 and proximal 65 ends of the wings do not terminate in a point. Rather, the ends of the wings are truncated. In other words, the distal 64 and proximal 65 ends of the wings 63 terminate at a junction with a lateral cord 66 connecting one side 67a of the wing to the other 67b. Crossing connecting members 68, 69 are disposed near the distal 64 end of the wings 63 to assist in maintaining the structural integrity of the wings 63.

Figure 8:
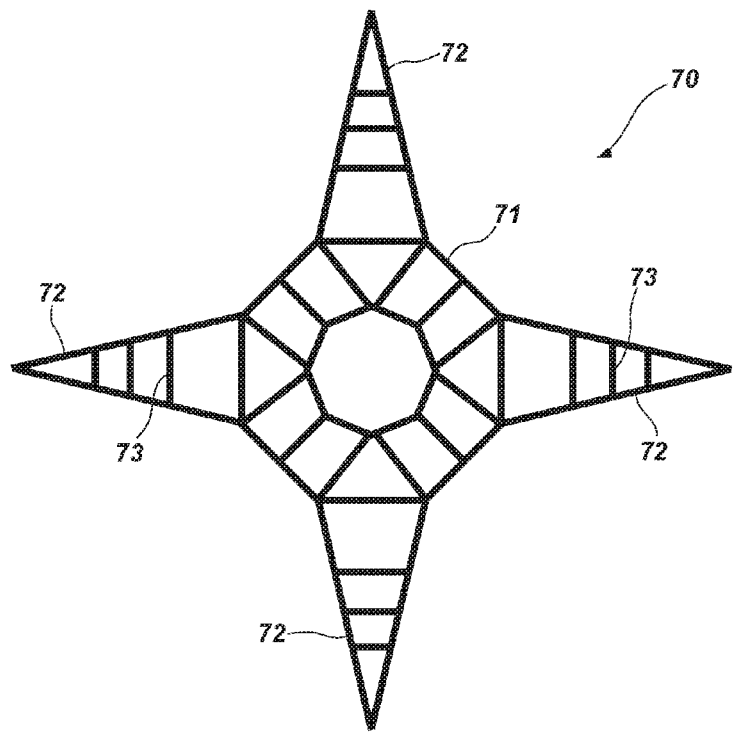
FIG. 8 shows a plurality of interconnected cord members in accordance with one embodiment of the invention.
Figure 9:
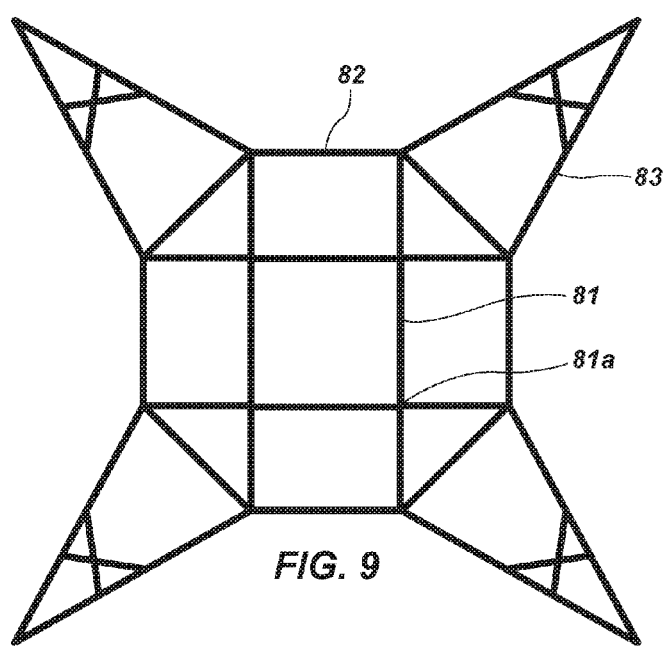
FIG. 9 shows a plurality of interconnected cord members in accordance with one embodiment of the invention.
Figure 10:
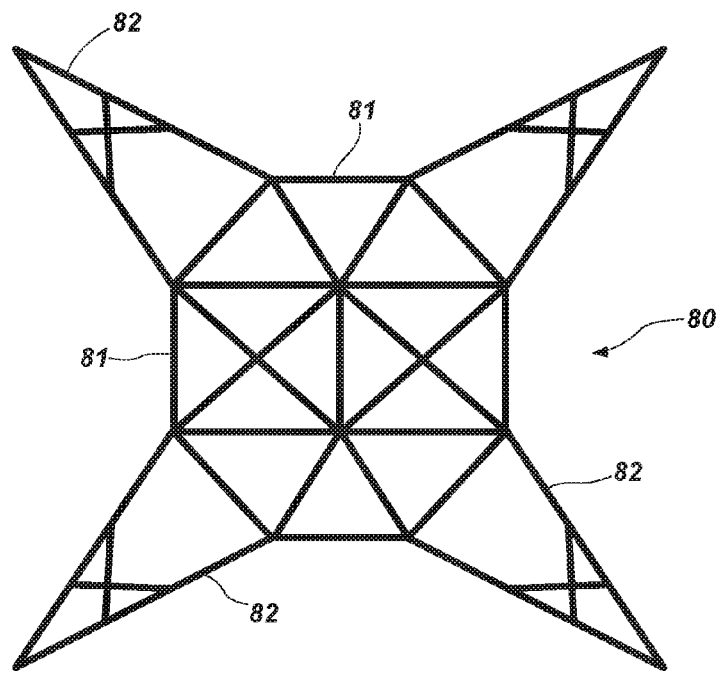
FIG. 10 shows a plurality of interconnected cord members in accordance with one embodiment of the invention.

With specific reference now to FIG. 8, in accordance with an additional embodiment of the invention, a net or cord assembly 70 is shown with two concentric octagons forming a main panel 71. Wings 72 extend outwardly from the main panel 71. Opposing sides of the wings 72 are connected by lateral cross members 73. In FIG. 9, in yet another embodiment of the invention, a square inner FIG. 81 is embedded within an octagon-shaped outer FIG. 83. Wings 83 extend outwardly from corners 81a of the square inner FIG. 81. In yet another embodiment, shown in FIG. 10, the net 80 comprises an outer octagon FIG. 81 having a plurality of junction points within the octagon FIG. 81. Wings 82 extend outwardly from the octagon 81 but are generally shaped to approximate a triangle rather than a diamond.

Figure 11:
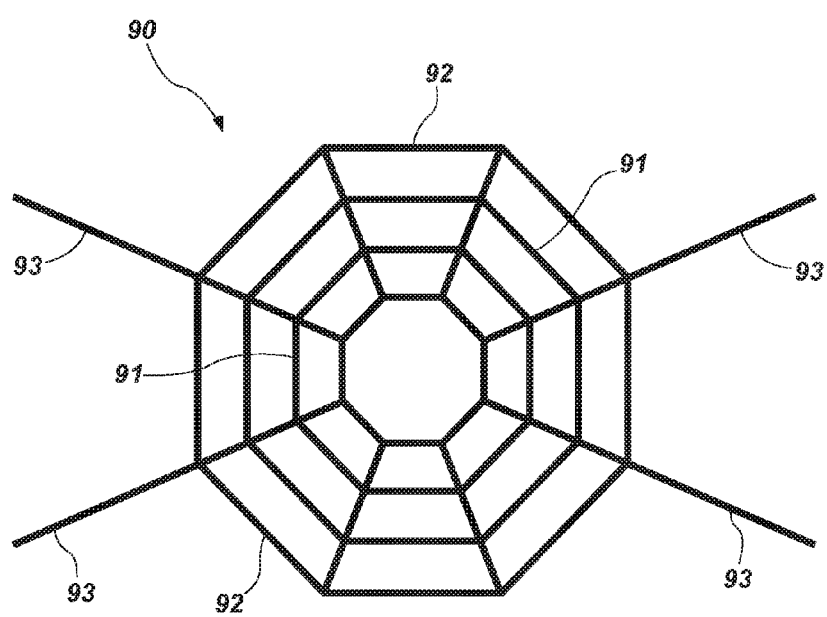
FIG. 11 shows a plurality of interconnected cord members in accordance with one embodiment of the invention.

With reference now to FIG. 11, in accordance with an additional embodiment of the invention, a cord assembly or net 90 is shown having a main panel 91. The main panel 91 is defined by an outer perimeter 92 that circumscribes a plurality of interconnected cord members forming cord assembly 90. The embodiment shown on FIG. 11 illustrates the main panel as comprising a plurality of concentric octagons, though it is understood and contemplated herein that the main panel 91 may comprise a plurality of any concentric shapes (e.g., circles, squares, hexagons, etc.) as suits a particular purpose or design. A plurality of single cord members 93 extend outward from the perimeter 92 of the main panel 91. The cord members are adapted to be disposed about the side of an enclosure and may be connected to the bottom of the enclosure by an appropriate means. In another embodiment, a plurality of cord pairs extend outward from the perimeter 92 of the main panel 91 and are adapted to be disposed about opposing corners of an enclosure. Individual members of each cord pair are disposed about adjacent sides of their respective corners.

Figure 12:
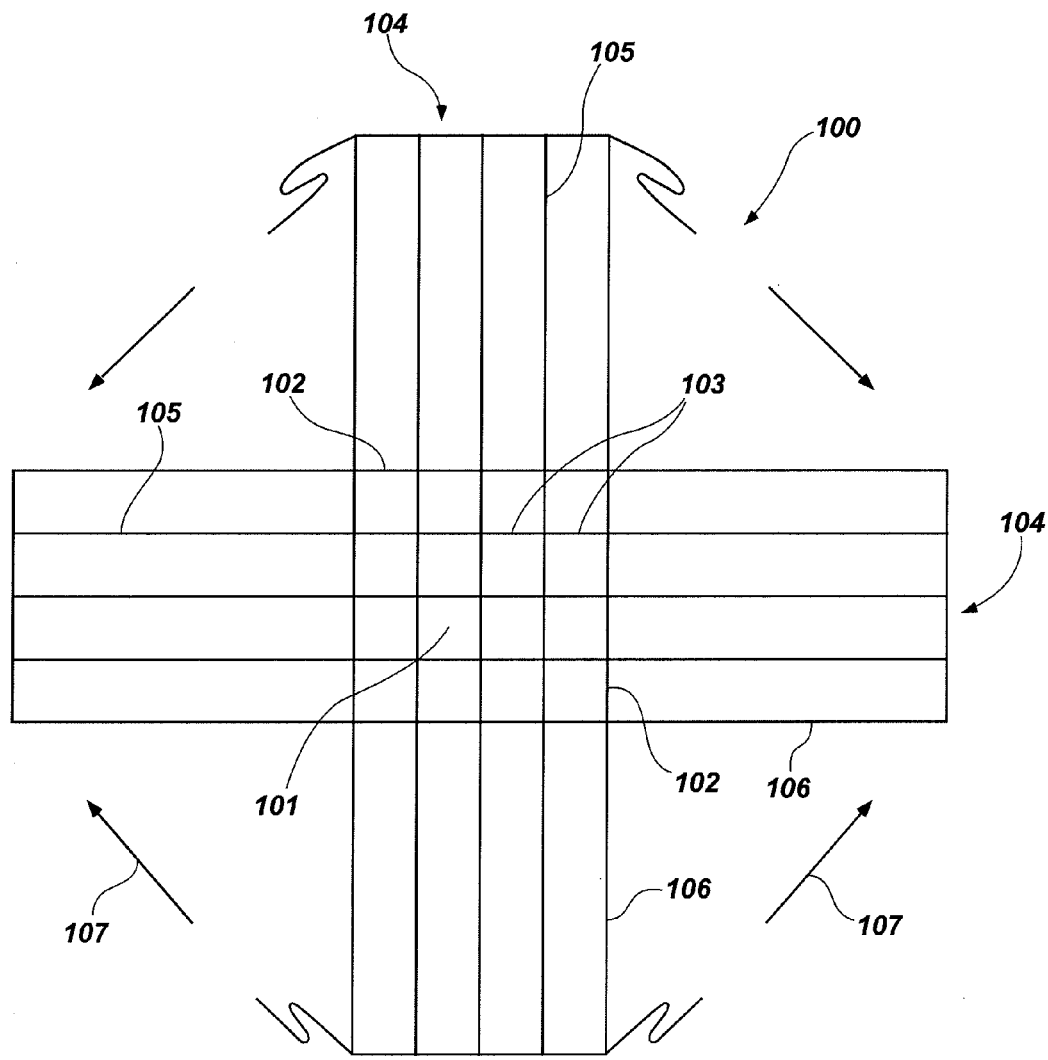
FIG. 12 shows a plurality of interconnected cord members in accordance with one embodiment of the invention.
Figure 13:
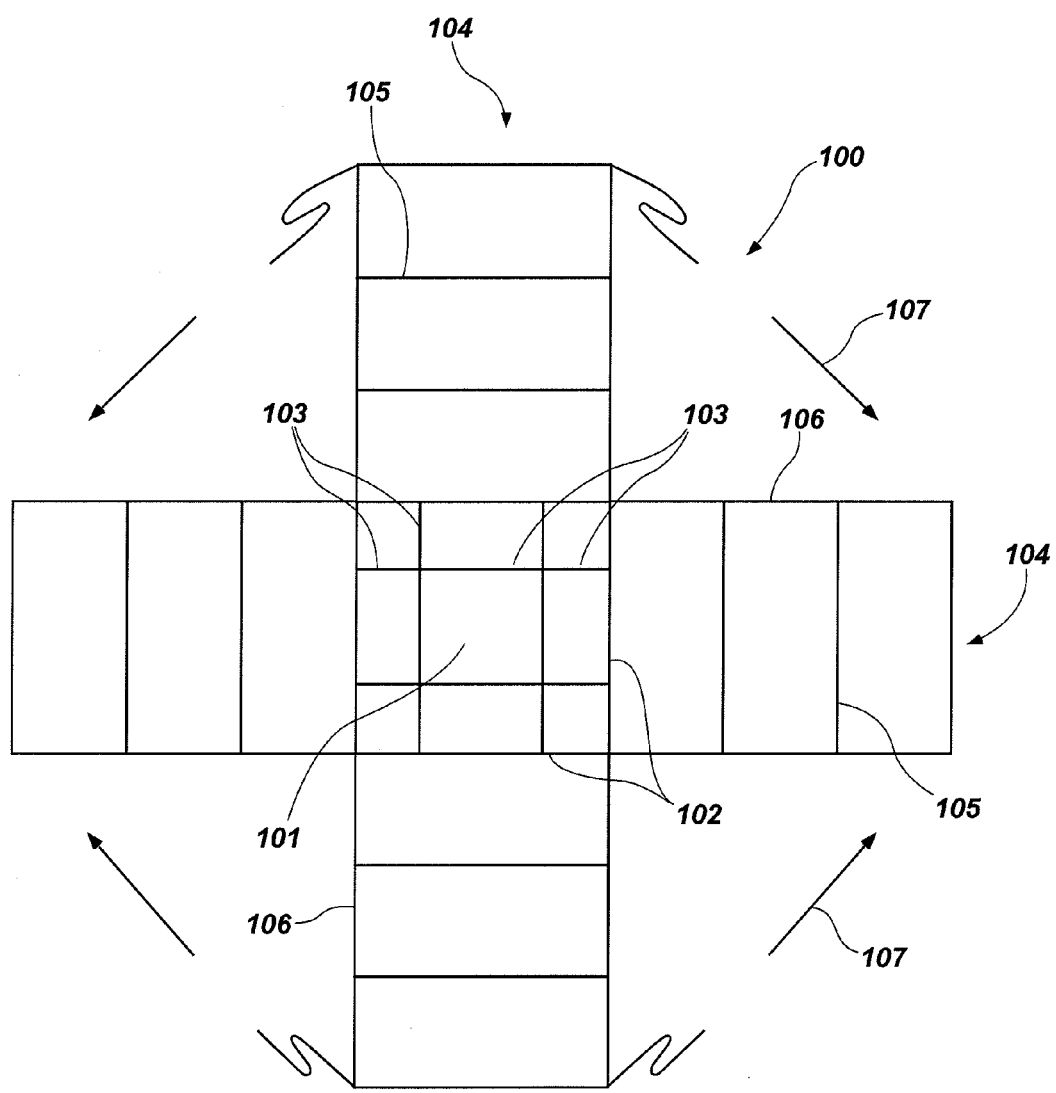
FIG. 13 shows a plurality of interconnected cord members in accordance with one embodiment of the invention.

With specific reference to FIGS. 12 and 13, in accordance with an additional embodiment of the invention, a cord assembly 100 is shown having a main panel 101. The main panel 101 is defined by an outer perimeter 102 circumscribing a plurality of interconnected members 103. Wing members 104 extend outward from the main panel 101 having internal cord members 105 to provide support and stability to the external cord members 106. The internal cord members 105 may be oriented parallel, perpendicular, or at forming an acute or obtuse angle with respect to the external cord members 106. Additional cord members 107 are attached between adjacent wing members 104 to provided added stability to the assembly as well as additional areas to attach ambient camouflage materials. The cord assemblies shown in FIGS. 12 and 13 function similar to the cord assemblies described in the preceding paragraphs.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

The invention claimed is:

1. A portable hunting blind, comprising:
a framework configured to enclose a space;
a cover member disposed about an exterior of and in contact with the framework;
a removable elastic net assembly detachably disposed about an exterior of the cover member capable of receiving and securing camouflage materials between members of the net assembly and the framework, wherein the net assembly comprises a first plurality of interconnected cord members forming a main panel disposed on a top portion of the cover member; and a second plurality of interconnected cord members forming at least two separate wing members extending outward from the main panel, wherein the at least two wing members are disposed about side portions of the framework, wherein interconnection of the resilient cord members of the net assembly facilitates securing the camouflage materials about the cover member, wherein the main panel comprises at least two concentric octagons.

2. The portable hunting blind of claim 1, wherein the wing members are generally shaped to approximate a diamond.

3. The portable hunting blind of claim 1, wherein at least two cord members forming the wing members extending outward from the main panel are interconnected by additional cord members extending laterally from one of the at least two cord members to the other of the at least two cord members.

4. The portable hunting blind of claim 3, wherein said wing members comprise at least two cord members extending outward from a common point of the main panel in substantially divergent directions for a first predetermined distance and in substantially convergent directions for a second predetermined distance at least until the at least two cord members arrive at a common point.

5. The portable hunting blind of claim 1, further comprising a plurality of removable camouflage materials disposed between members of the net assembly and the cover member.

* * * * *